(12) United States Patent
Temkine et al.

(10) Patent No.: US 9,424,622 B2
(45) Date of Patent: Aug. 23, 2016

(54) METHODS AND APPARATUS FOR PROCESSING GRAPHICS DATA USING MULTIPLE PROCESSING CIRCUITS

(71) Applicant: ATI TECHNOLOGIES, ULC, Markham, Ontario (CA)

(72) Inventors: Grigori Temkine, Markham (CA); Gordon Caruk, Bramalea (CA); Oleg Drapkin, Richmond Hill (CA)

(73) Assignee: ATI Technologies ULC, Markham (CA)

(*) Notice: Subject to any disclaimer, the term of this patent is extended or adjusted under 35 U.S.C. 154(b) by 0 days.

(21) Appl. No.: 13/924,958

(22) Filed: Jun. 24, 2013

(65) Prior Publication Data

US 2014/0035936 A1 Feb. 6, 2014

Related U.S. Application Data

(63) Continuation of application No. 11/139,733, filed on May 27, 2005, now abandoned.

(51) Int. Cl.
  *G06F 15/80* (2006.01)
  *G06F 15/16* (2006.01)
  *G06T 1/20* (2006.01)
  *G09G 5/36* (2006.01)

(52) U.S. Cl.
  CPC . *G06T 1/20* (2013.01); *G09G 5/363* (2013.01)

(58) Field of Classification Search
  USPC .......... 345/501, 502, 503, 504, 505, 519, 520
  See application file for complete search history.

(56) References Cited

U.S. PATENT DOCUMENTS

| 4,862,156 | A | | 8/1989 | Westberg et al. |
| 5,185,858 | A | | 2/1993 | Emery et al. |
| 5,712,664 | A | * | 1/1998 | Reddy .......................... 345/519 |
| 5,793,996 | A | * | 8/1998 | Childers ............. G06F 13/4027 345/520 |
| 5,799,204 | A | | 8/1998 | Pesto, Jr. |
| 6,028,643 | A | | 2/2000 | Jordan et al. |
| 6,100,936 | A | | 8/2000 | Jordan et al. |

(Continued)

FOREIGN PATENT DOCUMENTS

| EP | 0579402 A1 | 1/1994 |
| WO | 97/14133 | 4/1997 |

OTHER PUBLICATIONS

Synchronous Digital Video Switch; IBM Technical Disclosure; pp. 265-270; vol. 34, No. 4B; IBM Corporation; Sep. 1, 1991.

(Continued)

*Primary Examiner* — Jacinta M Crawford
(74) *Attorney, Agent, or Firm* — Faegre Baker Daniels LLP

(57) ABSTRACT

Methods and apparatus for providing multiple graphics processing capacity, while utilizing unused integrated graphics processing circuitry on a bridge circuit along with an external or discrete graphics processing unit is disclosed. In particular, a bridge circuit includes an integrated graphics processing circuit configured to process graphics jobs. The bridge circuit also includes an interface operable according to interface with a discrete graphics processing circuit. A controller is included with the bridge circuit and responsive whenever the discrete graphics processing circuit is coupled to the interface to cause the integrated graphics processing circuit to process a task of the graphics job in conjunction with operation of the discrete graphics processing circuit that is operable to process another task of the graphics job. Corresponding methods are also disclosed.

9 Claims, 3 Drawing Sheets

(56) References Cited

U.S. PATENT DOCUMENTS

| | | | |
|---|---|---|---|
| 6,104,417 A * | 8/2000 | Nielsen | G06F 12/1081 345/502 |
| 6,424,320 B1 | 7/2002 | Callway | |
| 6,630,936 B1 * | 10/2003 | Langendorf | G09G 5/363 345/505 |
| 6,760,031 B1 * | 7/2004 | Langendorf | G06F 3/14 345/502 |
| 7,372,465 B1 * | 5/2008 | Tamasi et al. | 345/502 |
| 7,466,316 B1 * | 12/2008 | Alben et al. | 345/502 |
| 7,586,492 B2 * | 9/2009 | Riach et al. | 345/502 |
| 7,663,633 B1 * | 2/2010 | Diamond et al. | 345/503 |
| 2002/0024523 A1 * | 2/2002 | Riffault | 345/520 |
| 2003/0142103 A1 * | 7/2003 | Hussain | G06T 11/40 345/545 |
| 2003/0188075 A1 * | 10/2003 | Peleg et al. | 710/306 |
| 2005/0190190 A1 | 9/2005 | Diard et al. | |
| 2005/0237327 A1 * | 10/2005 | Rubinstein et al. | 345/519 |
| 2006/0028478 A1 | 2/2006 | Rubinstein et al. | |
| 2006/0282604 A1 | 12/2006 | Temkine et al. | |

OTHER PUBLICATIONS

Bhatt, Ajay V.; Creating a PCI Express Interconnect; pp. 1-8; Intel Corporation; 2002.

Partial European Search Report for EP00305076; pp. 1-5; European Patent Office; Sep. 6, 2001.

International Search Report for PCT/US96/15583; European Patent Office; Jul. 14, 1997.

* cited by examiner

METHODS AND APPARATUS FOR PROCESSING GRAPHICS DATA USING MULTIPLE PROCESSING CIRCUITS

CROSS-REFERENCE TO RELATED APPLICATIONS

This application is a continuation application of U.S. patent application Ser. No. 11/139,733 filed on May 27, 2005, entitled METHODS AND APPARATUS FOR PROCESSING GRAPHICS DATA USING MULTIPLE PROCESSING CIRCUITS, owned by instant assignee and incorporated herein by reference.

FIELD OF THE DISCLOSURE

The present disclosure relates to methods and apparatus for processing video graphics data using multiple processors and, more particularly, to processing video graphics data using a combination of integrated graphics processing circuitry and discrete graphics processing circuitry.

BACKGROUND

In typical computer architectures, video graphics data that is to be processed from an application running on a processor, for example, may either be processed by integrated or discrete graphics processing circuitry. Integrated graphics processing circuitry is typically circuitry integrated in a bridge circuit connected to the processor system bus, otherwise known as a "Northbridge." Discrete processing circuitry is typically an external graphics processing unit that connects to the Northbridge via an interconnect utilizing an interconnect standard such as AGP, PCI, or PCI Express. In order to further increase the processing resources for video graphics processing, it is also known to utilize one or more discrete graphics processing units working in parallel, all of which are connected to the Northbridge via standard interconnects.

FIG. 1 illustrates a typical computer architecture known in the art utilizing this type of parallel processing. As shown, a main processor 102, such as a CPU or any other processing device is connected to a bridge circuit 104 via a system bus 106. As shown, the bridge circuit 104, which may be a Northbridge, includes an integrated graphics processing circuitry 108, which may be used for video graphics processing if an external graphics processing unit is not connected to the bridge circuit 104. An example of a known Northbridge circuit utilizing an integrated graphics processing circuitry is ATI's Mobility Radeon® 9100 IGP integrated graphics processor sold by ATI Technologies, Inc. of Markham, Ontario, Canada.

The architecture of FIG. 1 also illustrates at least two external or discrete graphics processing units 110 and 112 connected to the bridge circuit 104 via respective interconnects 114 and 116. These interconnects 114 and 116 may comprise any known standard bus including AGP, PCI or PCI Express. Additionally, the discrete graphics processing units 110 and 112 may be configured such that one processing unit connects through the other processing unit to the bridge circuit 104. This is shown, for example, by dashed line connection 117, where interconnect 116 would not be present (also indicated by the dashing line 116).

Currently when an add-in card, such as GPU 110 is plugged into an AGP, PCI or PCI Express slot connected to the Northbridge circuit 104, the processing circuitry 108 in the Northbridge 104 is not utilized and only the external graphics processing unit, such as GPU 110 is used to perform processing of graphics data. Accordingly, the resources of the integrated graphics processing circuitry 108 are usually not utilized and, thus, wasted.

Moreover, as discussed previously, it is known to employ parallel processors, such as GPU 110 and GPU 112 in order to increase the processing capacity and band width of the system 100 in order to deliver processed video and graphics to display media 118, which may include one or more monitors, PDA displays, cell phone displays or printers. Although the utilization of multiple graphics processing units (e.g., 110, 112) increases the system processing capacity, existing processing circuitry 108, as mentioned above, cannot be applied to the same graphics job, and potentially is unused when one or more external or discrete processing units are connected to the Northbridge circuit 104. It is noted that a graphics job, for purposes of this application, refers to a number of tasks, such as graphics processing or display operations, that are performed in conjunction to produce a display. For example, a graphics job could include multiple tasks such as vertex processing, 3D rendering, and driving the display that are performed in conjunction with one another to produce a display.

DETAILED DESCRIPTION

Figure 1:
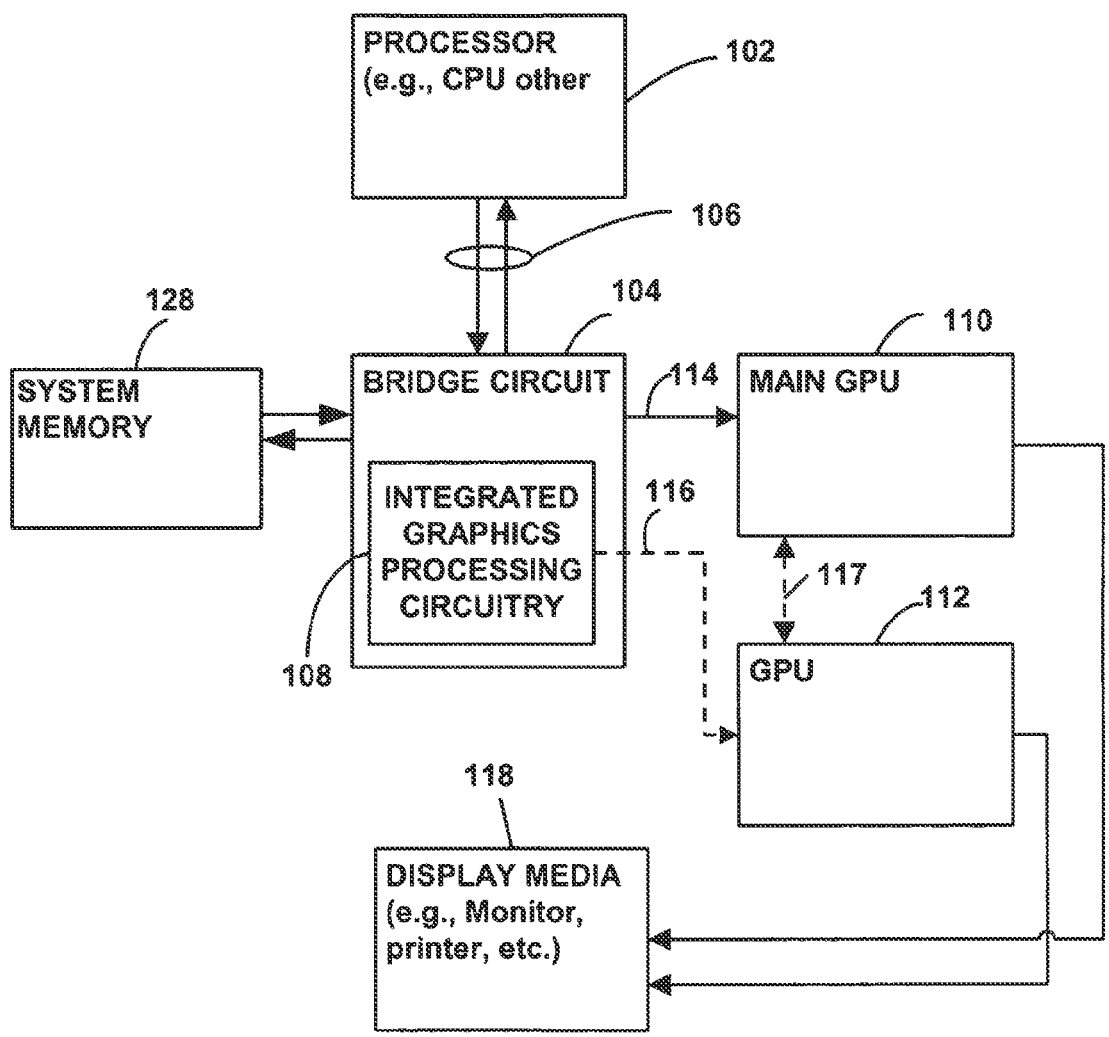
FIG. 1 illustrates an example of a conventional computer system architecture including integrated graphics processing as well as discrete graphics processing.

The present disclosure relates to methods and apparatus for providing multiple graphics processing capacity, while utilizing unused integrated graphics processing circuitry on a bridge circuit along with an external or discrete graphics processing unit. In particular, a bridge circuit includes an integrated graphics processing circuit configured to process graphics data. The bridge circuit also includes an interface operable according to a standard to interface with a discrete graphics processing circuit. A controller, which may be implemented with hardware, firmware or software, is also included and configured to detect when the external graphics processing circuit is connected to the interface and to cause the integrated graphics processing circuit to process at least a portion of the graphics data in conjunction with operation of the discrete graphics processing circuit, which processes another portion of the graphics data. The portions of the data are each associated with respective processing functions.

It is noted that the terms "processing graphics data" or "to process graphics data" (or similar terms related to processing graphics data) may be tasks performed in a graphics job, as defined previously, and may include tasks performing calculations. Also included in these terms (i.e., processing graphics data, etc.) is the displaying of graphics data, whether or not displaying necessarily requires calculations.

By using the internal graphics processing circuitry of a Northbridge circuit as one of the graphics controllers in a dual graphics controller architecture, the previously unutilized circuitry of the Northbridge is utilized, thus reducing the need for further external or discrete graphics processing units, thereby reducing system cost. Moreover, because graphics tasks are split between the external and internal graphics processing units, less memory can be provided with the external graphics processing unit, which can greatly reduce the system cost. For example, if the system is configured such that the internal graphics processing unit handles real time clients, which require careful control over latency and memory usage, the external graphics processing unit can be delegated to handle computationally intensive, latency insensitive, or low memory bandwidth tasks.

Additionally, by using the integrated graphics of the Northbridge, fewer external interfaces are required on the Northbridge circuit, further reducing the cost of the system. Moreover, in a system utilizing PCI Express, in particular, the downstream load over the PCI Express bus is potentially reduced in contrast to a dual discrete graphics processing system due to the above mentioned reduction in link bandwidth. That is, the integrated graphics processing circuitry is performing some of the graphics processing tasks, which were previously performed by a discrete graphics processing unit, the external graphics processing circuit will not require as much interconnect bandwidth and therefore will not need to utilize as many PCI Express lanes in the interface. Thus, a less expensive component can be built to perform these tasks.

Figure 2:
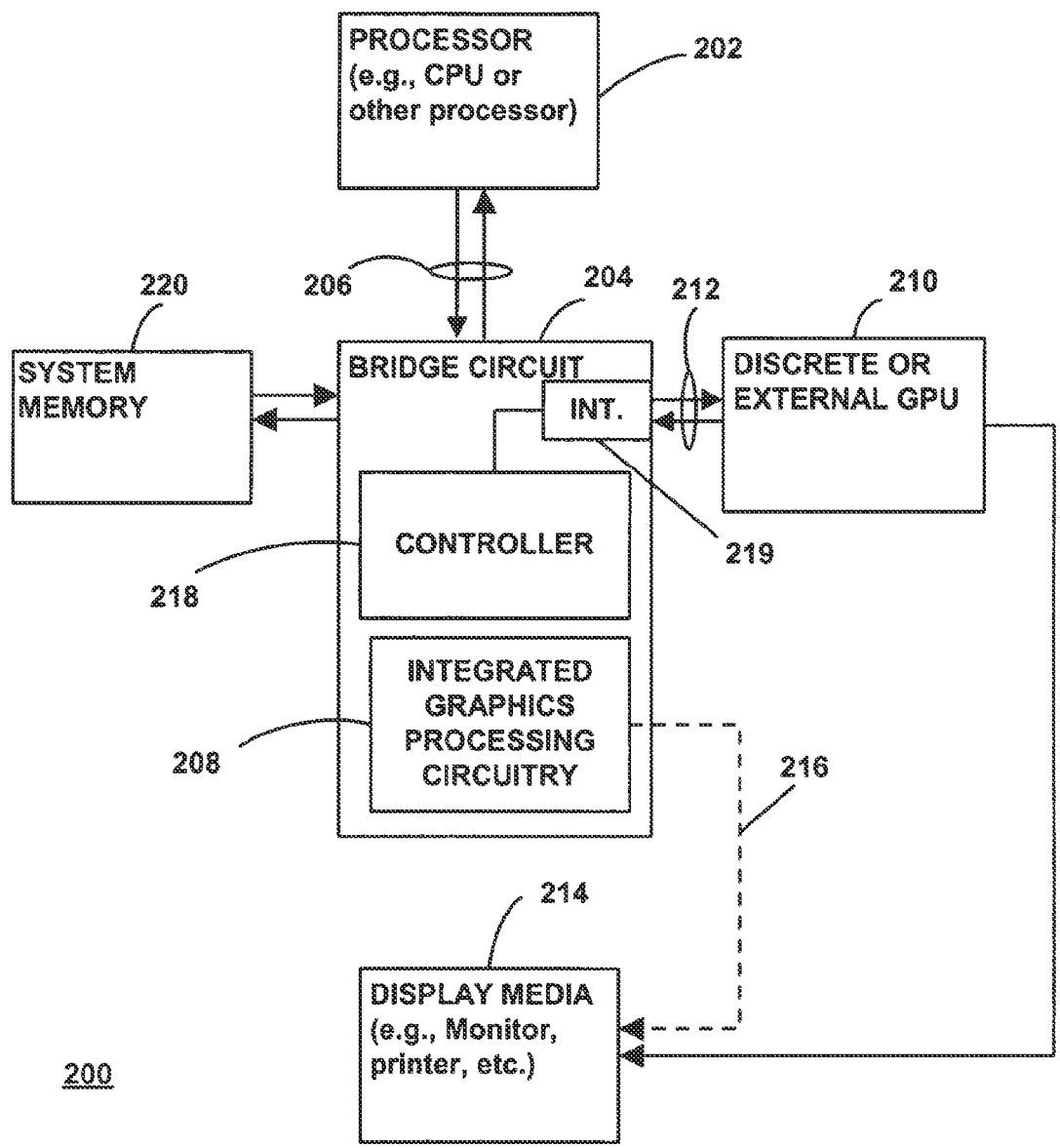
FIG. 2 illustrates a computer architecture according to an example of the present disclosure.

FIG. 2 illustrates an example of an architecture 200 according to the present disclosure. Architecture 200 includes a processor 202 such as a central processing unit or any other processor. The processor is connected to a bridge circuit 204, which is typically a Northbridge via a system bus 206. Similar to the conventional system illustrated in FIG. 1, the Northbridge 204 in FIG. 2 includes an integrated graphics processing circuitry 208 configured to process video graphics data, such as data received from an application running on the processor 202. Additionally, the circuit includes a main external graphics processing unit 210 connected to the Northbridge 204 with a standard interface 212, such as AGP, PCI or PCI Express. For purposes of the disclosed examples, interface 212 will be assumed to operate according to PCI Express.

Typically, the main GPU drives external display media 214, which may include one or more monitors, cell phone or PDA displays, or printers. It is noted that, an alternate connection from the Northbridge circuit 204 to the display media 214 may be utilized for display of data processed by circuitry 208 as indicated by dashed lined 216.

In order to maintain operation of integrated graphics processing circuitry, such as circuitry 208, when an external or discrete graphics processing unit is connected to the Northbridge 204, the bridge circuit 204 includes a controller 218, which may, or may not, have synchronization capabilities. 218 may be a set of independent data paths. 218 may be implemented as software, firmware, or hardware. In particular, controller 218 is used to ensure the processing circuitry 208 remains functional when an external GPU 210 is connected to an interface 219, which may be a PCI Express Interface, connecting the Northbridge 204 to the external GPU 210. More particularly, controller 218 may establish separate data paths for the integrated graphics processing circuitry 208 and the discrete graphics processor 210 for each to independently access at least one of the system processing circuitry (e.g., CPU 202) and the system memory (e.g., memory 220). This independent access ensures that the graphics processing circuitry may remain enabled and capable of processing data when the external GPU 210 is connected. Therefore both GPUs (208 and 210) may be cooperatively used to process graphics information for the graphics job.

Additionally, processing and frame buffer control, which may be performed either in controller 218, as shown, or processing circuitry 208, or in software, is used to direct which tasks each of the different processing circuitries 208 and 210 will perform and also to control frame buffer delivery of processed video graphics data to the display media 214. This affords the system 200 the capability of off-loading processing from the external GPU to the processing circuitry 208 on the Northbridge 204.

Figure 3:
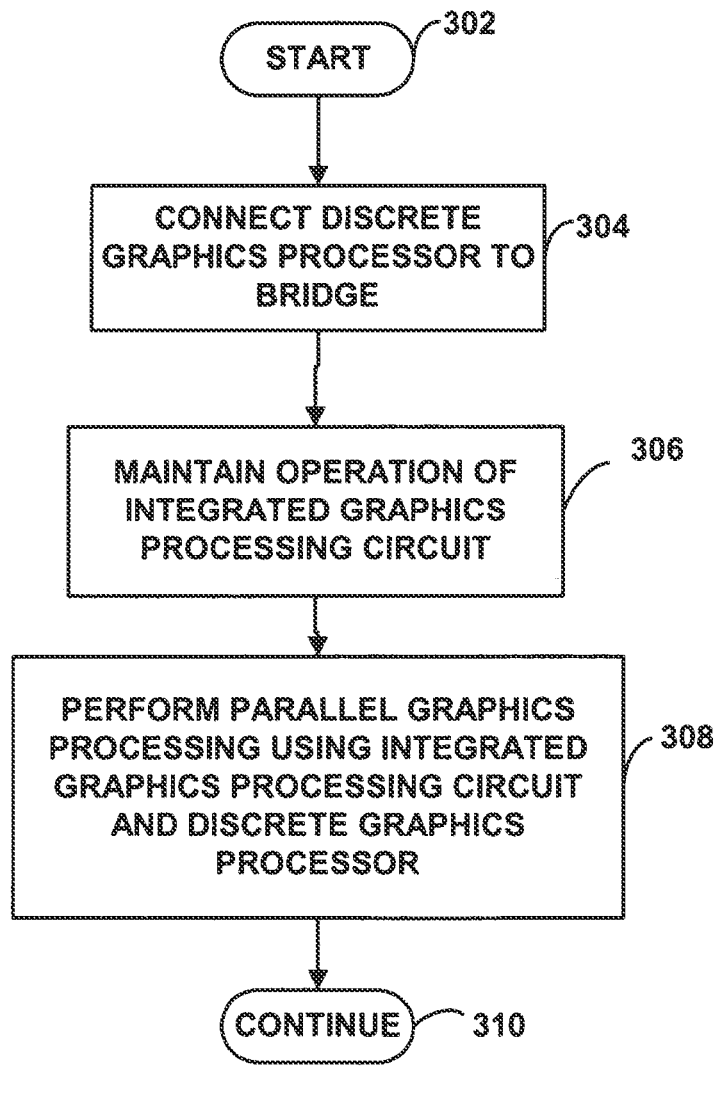
FIG. 3 illustrates a flow diagram of a method for achieving multiple graphics processing according to an example of the present disclosure.

FIG. 3 illustrates a flow diagram of an operational aspect of the system 200. The flow diagram 300 begin at an initialization block 302. Next, a discrete graphics processor is connected to the bridge 204 as illustrated in block 304. It is noted that this initialization may also include detection of the discrete graphics processor (e.g., processor 210) to the bridge 204. This detection may be performed either by software running within processing circuitry 208 of the Northbridge 204 or by software run by the central processing unit 202 directing the Northbridge with information passed via the system bus 206. Additionally, one of ordinary skill in the art will appreciate that the controller 218 may receive an acknowledgement of this detection.

Once the detection information is received by the controller 218, the control of the integrated graphics processing circuitry 208 ensures that the circuitry 208 is not disabled according to conventional operation, but is kept active, or in the case where the system is booting up, initialization and enablement of the circuitry 208 is performed. This part of the process is illustrated in block 306. The flow then proceeds to block 308 where parallel graphics processing (i.e., processing performed in conjunction) is performed using both the integrated processing circuit 208 and the discrete processing circuitry 210. After this operation, flow continues as illustrated in block 310. It is noted that the operation in block 308 of FIG. 3 is a continuous, on-going operation performed as long as parallel graphics processing is being effected.

The particular methods in which the frame buffer controller 218, or the software driver, direct processing of video graphics data received from an application are varied and numerous. According to one example, the controller 218 or the driver may divide processing tasks between circuitry 208 and circuitry 210. For example, the types of tasks may be divided where the integrated graphics processing circuitry 208 performs calculating vertexes, whereas the discrete graphics processing unit 210 performs rendering. In yet another example, tasks such as the 2D engine and 3D engine may be divided between the circuitry 208 and 210. In yet another example, the display could be driven by 208 and most, or all, of the graphics calculations would be performed by the discrete graphics processing unit 210. Although these examples are given, the different tasks allocated between multiple processors, and the methods of dividing or allocating tasks between the integrated circuitry and discrete circuitry are not limited to these and may include any other suitable methods that may be contemplated by those skilled in the art.

Further, it is contemplated that the processing tasks may be allocated by the synchronization controller 218 based on determining the currently available processing resources of the integrated circuitry 208 and external circuitry 210. For example, typical integrated graphics processing circuitry has less capacity and performance than discrete graphics processors. Accordingly, tasks which do not have high performance requirements, such as 2D rendering, could be given preference for processing by the integrated graphics whereas 3D processing would be performed by the discrete graphics processor 210. In the case where the discrete graphics has limited memory resources, tasks with considerable memory needs could be given preference for processing by the integrated graphics processor, whereas tasks that require less memory resources are given to the discrete graphics processor. Additionally, the utilization of PCI Express bus 212 may be optimized by performing processing tasks with the integrated graphics processing circuit 208 that may be simply "pass through" the main graphics processor 210 without any further processing, thus minimizing the utilization of the PCI Express bus 212 as information is sent from the processing circuitry 208 to the external processor 210 to be displayed by the display media 214. Alternatively, processed video graphics data may be sent directly from the processing circuitry 208 via an interface on the Northbridge and a connection 216 to the display media 214 in order reduce utilization of resources of the PCI Express bus 212.

As mentioned previously, the disclosed methods and apparatus afford cost reduction by utilizing extant processing resources typically found on a Northbridge circuit, which previously were wasted when an external graphics processing unit was connected to the Northbridge. Additionally, the number of external interfaces from the bridge circuit 204 is reduced as only one external or discrete graphics processing circuit 210 is utilized, while providing multiple, parallel graphics processing, as illustrated in the example of FIG. 2.

A further feature of the presently disclosed methods and apparatus is that the dividing of the full range of tasks for the graphics job between the internal and external graphics processing units affords the graphics subsystem the ability to tune the processing to utilize the available resources for maximum efficiency. The various tasks for each graphics job are distributed to the graphics processing units that can process them while using the least amount of system resources in the least amount of time. An example of this optimization is PCI Express. Since PCI Express requires equal numbers of downstream and upstream circuits, circuits may not be dynamically allocated from upstream to downstream data transmission. Thus, by performing certain processing tasks which require many bytes of system memory for each byte of data produced with the integrated graphics processing circuitry, less transmission from the Northbridge to the external graphics processor will be required.

It will be recognized that all or some of the disclosed operations may be useful as applied to printers or other devices. For example, the disclosed processor, circuits or graphic processor(s) may process information and/or output information in any suitable color space including but not limited to Y,U,V, RGB, YPbPr or CMYK (cyan, magenta, yellow, black) color spaces. Suitable considerations should be taken into account when converting from RGB to CMYK or vice versa or between any two color spaces. For example, as is known, the ink type, paper type, brightness settings, and other factors should be considered in converting from or to RGB space and CMYK space as a color displayed on a display screen may be different from that output by a color printing operation.

The CMYK color space relates particularly to subtractive color technologies, where adding more color takes a pixel or dot closer to black, just as RGB relates to additive color technologies (where adding more color takes a pixel or dot closer to white). As such, if desired, pixel information, or dot color information, may be processed and/or output for any suitable display medium including electronic display screens or for printers on display medium such as paper, film or any other suitable article.

The above-detailed description of the examples has been presented for the purposes of illustration and description and not by limitation. It is therefore contemplated that the present application covers any additional modifications, variations or equivalents that fall within the spirit and scope of the basic underlying principles disclosed above and the appended claims.

What is claimed is:

1. An apparatus comprising:
   an integrated graphics processing circuit configured to process graphics jobs from an application run on a processor;
   a discrete graphics processing circuit;
   an interface operable to interface with the discrete graphics processing circuit;
   a system memory operably coupled to the integrated graphics processing circuit and the discrete graphics processing circuit; and
   a controller operably coupled to the system memory and configured to detect when the discrete graphics processing circuit is coupled to the interface and to cause the integrated graphics processing circuit to process at least one task of a graphics job at the same time as the discrete graphics processing circuit operates to process at least another task of the same graphics job, wherein the graphics job includes a series of graphics calculation processing tasks for manipulating data so as to produce an image for display, wherein the integrated graphics processing circuit is configured to process the at least one task of the graphics job by performing at least a first number of the series of graphics calculation processing tasks for manipulating data so as to produce the image at the same time as the discrete graphics processing circuit operates to process the at least another task of the same graphics job by performing at least a second number of the series of graphics calculation processing tasks for manipulating data so as to produce the image, wherein the controller establishes separate data paths for the integrated graphics processing circuit and the discrete graphics processing circuit for each to independently access the system memory to manipulate the data.

2. The apparatus of claim 1 wherein the controller is comprised of at least one of a central processing unit and a controller in a bridge circuit.

3. The apparatus of claim 1, wherein the at least the first number of the series of graphics calculation processing tasks for manipulating data so as to produce the image includes calculating vertexes, and wherein the at least the second number of the series of graphics calculation processing tasks for manipulating data so as to produce the image includes rendering.

4. An apparatus comprising:
   an integrated graphics processing circuit configured to process graphics jobs from an application run on a processor;
   a discrete graphics processing circuit;
   an interface operable to interface with the discrete graphics processing circuit;
   a system memory operably coupled to the integrated graphics processing circuit and the discrete graphics processing circuit; and
   a controller operably coupled to the system memory and configured to detect when the discrete graphics processing circuit is coupled to the interface and to cause the integrated graphics processing circuit to perform at least a first number of graphics calculation processing tasks for manipulating data so as to produce an image for display, the at least the first number of graphics calculation processing tasks including 2D engine tasks, at the same time as the discrete graphics processing circuit operates to perform at least a second number of graphics calculation processing tasks for manipulating data so as to produce an image for display, the at least the second number of graphics calculation processing tasks including 3D rendering tasks, wherein the controller establishes separate data paths for the integrated graphics processing circuit and the discrete graphics processing circuit for each to independently access the system memory to manipulate the data.

5. An apparatus comprising:
an integrated graphics processing circuit configured to process graphics jobs from an application run on a processor;
a discrete graphics processing circuit;
an interface operable to interface with the discrete graphics processing circuit;
a system memory operably coupled to the integrated graphics processing circuit and the discrete graphics processing circuit; and
a controller operably coupled to the system memory and configured to detect when the discrete graphics processing circuit is coupled to the interface and to cause a first graphics calculation processing task for manipulating data so as to produce an image for display, the first graphics calculation processing task having higher memory needs, to be given preference for processing by the integrated graphics processing circuit; and to cause second graphics calculation processing tasks for manipulating data so as to produce the image of a same graphics job, the second graphics calculation processing tasks requiring less memory resources, to be given to the discrete graphics processing circuit for processing at the same time as at least a portion of the processing of the first graphics calculation processing task by the integrated graphics processing circuit, wherein the controller establishes separate data paths for the integrated graphics processing circuit and the discrete graphics processing circuit for each to independently access the system memory to manipulate the data.

6. A method carried out by a video graphics processing system comprising:
detecting, by a controller, when a discrete graphics processing circuit is coupled to an interface;
in response to the detection, causing, by the controller, an integrated graphics processing circuit to process at least one task of a graphics job at the same time as using the discrete graphics processing circuit to process at least another task of the same graphics job, the graphics job including a series of graphics calculation processing tasks for manipulating data so as to produce an image for display, the integrated graphics processing circuit processing the at least one task of the graphics job by performing at least a first number of the series of graphics calculation processing tasks for manipulating data so as to produce the image at the same time as the discrete graphics processing circuit processes the at least another task of the same graphics job by performing at least a second number of the series of graphics calculation processing tasks for manipulating data so as to produce the image, wherein separate data paths are established for the integrated graphics processing circuit and the discrete graphics processing circuit for each to independently access system memory for manipulating the data.

7. The method of claim 6, wherein the at least the first number of the series of graphics calculation processing tasks for manipulating data so as to produce the image includes calculating vertexes, and wherein the at least the second number of the series of graphics calculation processing tasks for manipulating data so as to produce the image includes rendering.

8. A method carried out by a video graphics processing system comprising:
detecting, by a controller, when a discrete graphics processing circuit is coupled to an interface; and
in response to the detection, causing, by the controller, an integrated graphics processing circuit to perform at least a first number of graphics calculation processing tasks for manipulating data so as to produce an image for display, the at least the first number of graphics calculation processing tasks including 3D engine tasks, at the same time as the discrete graphics processing circuit operates to perform at least a second number of graphics calculation processing tasks for manipulating data so as to produce the image, the at least the second number of graphics calculation processing tasks including 2D rendering tasks, wherein separate data paths are established for the integrated graphics processing circuit and the discrete graphics processing circuit for each to independently access system memory for manipulating the data.

9. A method carried out by a video graphics processing system comprising:
detecting, by a controller, when a discrete graphics processing circuit is coupled to an interface;
in response to the detection, causing, by the controller, a first graphics calculation processing task for manipulating data so as to produce an image for display, the first graphics calculation processing task having higher memory needs, to be given preference for processing by an integrated graphics processing circuit configured to process graphics jobs from an application run on a processor, and to cause second graphics calculation processing tasks for manipulating data so as to produce the image of a same graphics job, the second graphics calculation processing tasks requiring less memory resources, to be given to the discrete graphics processing circuit for processing at the same time as at least a portion of the processing of the first graphics calculation processing task by the integrated graphics processing circuit, wherein separate data paths are established for the integrated graphics processing circuit and the discrete graphics processing circuit for each to independently access system memory for manipulating the data.

* * * * *